United States Patent
Willcox et al.

(10) Patent No.: US 11,399,529 B2
(45) Date of Patent: *Aug. 2, 2022

(54) INSECT TRAP

(71) Applicant: Brandenburg (UK) Limited, West Midlands (GB)

(72) Inventors: John C. Willcox, West Midlands (GB); Mathew V. Kaye, West Midlands (GB)

(73) Assignee: BRANDENBERG (UK) LIMITED

( * ) Notice: Subject to any disclaimer, the term of this patent is extended or adjusted under 35 U.S.C. 154(b) by 0 days.

This patent is subject to a terminal disclaimer.

(21) Appl. No.: 16/892,280

(22) Filed: Jun. 3, 2020

(65) Prior Publication Data
US 2020/0288693 A1 Sep. 17, 2020

Related U.S. Application Data

(62) Division of application No. 15/922,893, filed on Mar. 15, 2018, now Pat. No. 10,694,733, which is a (Continued)

(30) Foreign Application Priority Data

May 2, 2008 (GB) .................................... 0808534

(51) Int. Cl.
*A01M 1/02* (2006.01)
*A01M 1/14* (2006.01)
(Continued)

(52) U.S. Cl.
CPC .............. *A01M 1/026* (2013.01); *A01M 1/04* (2013.01); *A01M 1/08* (2013.01); *A01M 1/145* (2013.01);
(Continued)

(58) Field of Classification Search
CPC .......... A01M 1/02; A01M 1/026; A01M 1/04; A01M 1/08; A01M 1/145; A01M 1/16
See application file for complete search history.

(56) References Cited

U.S. PATENT DOCUMENTS

| 391,014 A | 10/1888 | Bosse |
| 693,536 A | 2/1902 | Baker |

(Continued)

FOREIGN PATENT DOCUMENTS

| AU | 736705 B2 | 8/2001 |
| BR | 6801904 U | 4/1990 |

(Continued)

OTHER PUBLICATIONS

English abstract for DE-3810065.
(Continued)

*Primary Examiner* — Richard G Davis
(74) *Attorney, Agent, or Firm* — Fishman Stewart PLLC

(57) ABSTRACT

An insect catching device may include at least two insect capture surfaces, a first surface including a first color, and a second surface including a second, lighter color relative to the first color of the first surface. The second color of the second surface may highlight the presence of insects captured thereon facilitating at least one of ease of counting and ease of identification of captured insects. The insect catching device may also include a line of weakening disposed between the first surface and the second surface. The line of weakening may include at least one perforation. The second surface may be detachable from the first surface along the line of weakening. The first color may be configured to decrease visibility of captured insects on the first surface observable by a viewer through an insect trap cover.

20 Claims, 10 Drawing Sheets

Related U.S. Application Data division of application No. 14/676,782, filed on Apr. 1, 2015, now Pat. No. 9,949,472, which is a division of application No. 12/990,620, filed as application No. PCT/GB2009/001097 on Apr. 30, 2009, now Pat. No. 9,027,276.

(51) Int. Cl.
*A01M 1/16* (2006.01)
*A01M 1/04* (2006.01)
*A01M 1/08* (2006.01)
*A01M 99/00* (2006.01)
*F21V 23/06* (2006.01)
*F21V 31/00* (2006.01)

(52) U.S. Cl.
CPC .............. *A01M 1/16* (2013.01); *A01M 99/00* (2013.01); *F21V 23/06* (2013.01); *F21V 31/005* (2013.01)

(56) References Cited

U.S. PATENT DOCUMENTS

| | | | |
|---|---|---|---|
| 1,655,128 | A | 1/1928 | Berghorn |
| 2,097,924 | A | 11/1937 | Kell |
| 4,959,923 | A | 10/1990 | Aiello et al. |
| 5,095,648 | A * | 3/1992 | Keenan .................. A01M 1/02 43/133 |
| 5,396,729 | A | 3/1995 | Vejvoda |
| 5,425,197 | A | 6/1995 | Smith |
| 5,722,199 | A | 3/1998 | Demarest et al. |
| 5,950,355 | A | 9/1999 | Gilbert |
| 6,108,965 | A * | 8/2000 | Burrows ............... A01M 1/145 43/113 |
| 6,108,966 | A | 8/2000 | Otomo et al. |
| 6,161,327 | A * | 12/2000 | Thomas ................. A01M 1/145 43/114 |
| 6,397,515 | B1 | 6/2002 | Brown et al. |
| 6,516,558 | B1 * | 2/2003 | Lingren .................. A01M 1/02 43/107 |
| 6,708,445 | B1 | 3/2004 | Israely |
| 7,401,436 | B2 | 7/2008 | Chyun |
| 2002/0073611 | A1 | 6/2002 | Greening |
| 2002/0078620 | A1 * | 6/2002 | Nelson .................. A01M 1/145 43/113 |
| 2003/0049296 | A1 | 3/2003 | Knauf et al. |
| 2003/0089023 | A1 * | 5/2003 | Nelson .................. A01M 1/145 43/113 |
| 2003/0089024 | A1 * | 5/2003 | Nelson .................. A01M 1/145 43/113 |
| 2006/0086039 | A1 | 4/2006 | Israely et al. |
| 2006/0107583 | A1 * | 5/2006 | Wu ........................ A01M 1/145 43/113 |
| 2007/0039236 | A1 * | 2/2007 | Geier ...................... A01M 1/02 43/139 |
| 2007/0094915 | A1 * | 5/2007 | Plato ....................... A01M 1/14 43/114 |
| 2007/0124987 | A1 * | 6/2007 | Brown ................... A01M 1/023 43/113 |
| 2008/0229652 | A1 | 9/2008 | Willcox et al. |
| 2010/0212211 | A1 * | 8/2010 | Scheubeck ............ A01M 1/023 43/107 |

FOREIGN PATENT DOCUMENTS

| | | | |
|---|---|---|---|
| CA | 2477340 | A1 | 9/2003 |
| CA | 2477340 | A1 * | 9/2003 .............. A01M 1/02 |
| CN | 1046436 | A | 10/1990 |
| CN | 2595168 | Y | 12/2003 |
| CN | 1518874 | A | 8/2004 |
| CN | 2766552 | Y | 3/2006 |
| CN | 2790173 | Y | 6/2006 |
| CN | 200980295 | Y | 11/2007 |
| DE | 3810065 | C1 | 4/1989 |
| EP | 1212942 | A1 | 6/2002 |
| EP | 1457111 | A1 | 9/2004 |
| GB | 2171882 | A | 9/1986 |
| GB | 2258599 | A | 2/1993 |
| GB | 2275409 | A | 8/1994 |
| JP | S48-32440 | Y1 | 10/1973 |
| JP | H3-116607 | U | 12/1991 |
| JP | H08-33444 | B2 | 3/1996 |
| JP | H11-32648 | A | 2/1999 |
| JP | H11-46657 | A | 2/1999 |
| JP | 2000-4754 | A | 1/2000 |
| JP | 2000-245322 | A | 9/2000 |
| JP | 2000-287600 | A | 10/2000 |
| JP | 2001069894 | A | 3/2001 |
| JP | 2001-103897 | A | 4/2001 |
| JP | 2001-211805 | A | 8/2001 |
| JP | 2002-37271 | A | 2/2002 |
| JP | 2002-308283 | A | 10/2002 |
| JP | 2004-261155 | A | 9/2004 |
| JP | 2005046045 | A | 2/2005 |
| JP | 2007-8 | A | 1/2007 |
| KR | 900008866 | Y1 | 9/1990 |
| KR | 10-0538043 | B1 | 12/2005 |
| KR | 100659585 | B1 | 12/2006 |
| KR | 10-0707929 | B1 | 4/2007 |
| RU | 2127050 | C1 | 3/1999 |
| WO | 9220224 | A1 | 11/1992 |
| WO | 9701272 | A1 | 1/1997 |
| WO | 2009/133381 | A1 | 11/2009 |

OTHER PUBLICATIONS

English abstract for JP-2005046045.
English Abstract for KR-10-0538043-B1 as part of Korean Office Action dated Aug. 21, 2014.
English abstract for KR-10-0707929-B1 as part of Korean Office Action dated Aug. 21, 2014.
Bibliographic Data Sheet for JP-H3-11607-U indicating no abstract available.
Bibliographic Data Sheet for JP-S48-32440-Y1 indicating no abstract available.
Australian Examination report dated Dec. 4, 2018.
English abstract for GB-2258599.
English abstract for RU-2127050.
Korean Preliminary Rejection dated Jun. 11, 2018.
Japanese office action dated Jun. 23, 2016.
English translation of Japanese office action dated Jun. 23, 2016.
Japanese office action dated Apr. 26, 2017.
English machine translation of JP-H11-32648.
English machine translation of JP-2001-103897.
English abstract for JP-2004-261155.
English abstract for JP-2001-211805.
English abstract for JP-2000004754.
English abstract for JP-2000-287600.
English machine translation of JP-2002-308283.
Great Britain Search & Examination Report dated Feb. 17, 2012.
English abstract for JP-2001069894.
European search report dated Feb. 19, 2018.
Chinese office action dated Mar. 25, 2014.
English abstract of CN 200980295.
English abstract of CN 2595168.
English abstract of CN-1518874.
Azevedo Filho, W.S.; Carvalho G.S. "Guide for collection and identification of spittlebugs in citrus orchards in Rio Grande do Sulk." Porto Alegre: EDIPUCRS, 2004. 87p.
Espacenet document indicating that no English abstract available for BR6801904.
Brazialian office action dated Oct. 2, 2018.
Brazialian office action dated Nov. 21, 2017.
Brazialian office action dated May 2, 2018.
English machine translation of JP-H8-33444.
English Machine translation of JP 2002-37271.

* cited by examiner

INSECT TRAP

CROSS REFERENCE TO RELATED APPLICATIONS

This application is a Continuation of U.S. patent application Ser. No. 15/922,893, filed on Mar. 15, 2018, which is a Divisional of U.S. patent application Ser. No. 14/676,782 (U.S. Pat. No. 9,949,472), filed on Apr. 1, 2015, which is a Divisional of U.S. patent application Ser. No. 12/990,620 (U.S. Pat. No. 9,027,276), filed Nov. 1, 2010, which is a National Phase of PCT/GB2009/001097 filed Apr. 30, 2009, which claims priority to United Kingdom Patent Application No. 0808534.2, filed May 2, 2008, now GB 2459717(B). The contents of all of these applications are hereby incorporated by reference in their entirety.

TECHNICAL FIELD

The present invention relates to an insect trap and more particularly to an insect trap which has been designed to facilitate simple and efficient servicing, maintenance and cleaning.

BACKGROUND

Insect traps of various types are well known. A particularly common trap type, particularly for flying insects, comprises an insect attractant means, such as, for example a UV light source and an insect trapping means, such as, for example an adhesive board or paper contained in a housing. The flying insects are attracted to the trap, enter the housing through openings and get caught on the trapping means. To maintain efficiency of capture, the adhesive board or paper needs to be regularly replaced and the trap cleaned. The adhesive board or paper also needs to be inspected and records kept. The lights also need to be cleaned as insects get "welded" to the bulbs and in any case, the lights have a limited life span.

The traps are often fitted outdoors or in factories, and are mounted on walls to an electricity supply. Therefore, if they are to be cleaned with water, or the factories experience jet washing of floors and walls, the electrical contacts need to be isolated to avoid risk of electrocution. In some traps, a "sealable" cover is screwed from each light over each respective electrical contact. This means a person servicing the traps needs to unscrew two caps for each light and there are often at least two and more typically at least three lights per trap. Additionally, since the lights are positioned in front of the glue board on a housing base, access can be difficult and the job unpleasant.

SUMMARY

It is an object of the present invention to provide one or more traps which allow for simple and efficient servicing maintenance and cleaning. It is a separate object to make identification of e.g. the number and/or type of captured insects easier and to facilitate good record keeping.

According to a first aspect of the present invention there is provided a trap for catching insects comprising
 a. a back housing;
 b. a frame, swing mounted to said housing; and
 c. a cover comprising openings allowing insects to enter the trap wherein said frame supports one or a plurality of lights such that said frame and lights can be moved from a first position, where they overlie the back housing, to a second position where they lie clear of the back housing such that an insect catching means, which may be fitted over the back housing, is readily accessible for replacement during servicing.

By supporting the lights on a separate frame, which can be swung away from the back housing, allows easier access to both the lights and the insect catching means. In particular, it avoids a requirement when mounting the trap to provide sufficient clearance above the trap to allow for fitting of the insect catching means.

Typically, one or a plurality of reflectors is fitted behind the one or more lights and the novel construction allows for these to be fitted in a manner allowing for quick release and easy maintenance. In this regard, the reflectors may be supported by opposing retaining stops a gap there between being accessed by flexing the reflector so it "snap locks" into the gap between the opposing stops.

The frame preferably takes the form of a light weight perimeter frame and comprises a flanged handle at a side opposite to that which is hinged to the back housing. It comprises ducting or channels which communicate with the back housing in a manner which prevents water ingress. It is through these channels that the electric wiring is ducted and the channels are then appropriately sealed.

Preferably, the back housing is shaped so that it can also receive fluorescent high frequency electronic ballast. Such ballast is carbon friendly, provides for flicker free start of the lights, offers higher UV output and avoids the need for a starter.

In a favoured embodiment, two traps of the invention may be connected back to back such that they can be suspended.

To prevent the risk of accidental breakage of the lights on opening, the trap is designed to limit the degree of swing of the frame. This may be achieved by the provision of a stop. It is also held in a shut position by means of a retaining mechanism, such as a magnetic lock.

Preferably the trap further comprising a mechanism which prevents removal of the cover until the frame has been moved from its closed position. This prevents accidental displacement of the cover, thereby reducing the possibility of cover breakage.

The inner face of the back housing preferably comprises a means for raising the insect capture means there from at a number of points so as to ease its removal. Such raised means may comprise protrusions such as pimples or ridges.

The insect caching means is preferably retained in position by retaining means which may be regularly spaced. In a preferred embodiment the retainers are spaced and shaped to receive a castellated insect capture means allowing it to be positioned in a two step process comprising aligning the castellated paper with the retainers and then sliding it down so it is retained in position.

The back housing is designed to comprise or allow for the fitting of one or more of, for example, an electrical IEC socket, a heat sink, mounting means, air vents and cable stowage.

Preferably the cover is translucent and comprises an innermost surface which helps maximise UV emission from the trap as claimed in EP1457111.

More preferably it is adapted to ensure the lights are not readily visible through the cover as claimed in EP0947134. To this end, in a particularly favoured embodiment the cover comprises louver openings angled to prevent the lights being visible when viewed substantially perpendicularly to a plane of the back housing. A more favoured arrangement is one in which the louver openings are paired about a centre point to provide a downward and upward inflexion respectively. Such an arrangement helps to draw air in at the bottom of the trap.

According to a second and independent aspect of the present invention there is also provided a trap for catching insects comprising a. a back housing;
b. a plurality of lights; and
c. a cover wherein said trap is adapted for ease of servicing and jet cleaning by the provision of shields each of which sealably protect, from water ingress, a plurality of lights at the positions where they connect to electrical fittings.

Preferably, the shields are secured in position by fittings which can be released manually.

A preferred trap comprising these shields further comprises the advantageous features described with respect to the first aspect of the invention.

According to a third and independent aspect of the present invention there is also provided an insect catching means comprising at least two insect capture surfaces, a first surface of which is one colour or shade, and a second surface, which is designed to facilitate ease of counting and or identification of captured insects, which is a different colour or shade to the first surface.

Preferably the second surface can be easily detached from the first surface for record keeping, there being a line of weakening e.g. perforation, between the first and second surface.

In a preferred embodiment the second surface includes a non-glued area which can have date written or easily appended thereto, such as date of use information. Preferably the second surface is a light colour or shade designed to highlight the captured insects, and more preferably contains grid lines to facilitate easy determination of insect number per given area.

Preferably the first surface is a darker shade or colour to absorb light and make captured insects less visible to someone viewing the trap through e.g. a cover.

BRIEF DESCRIPTION OF THE DRAWINGS

The various aspects of the invention will be described further, by way of example, with reference to the following figures in which.

DETAILED DESCRIPTION

Figure 5:
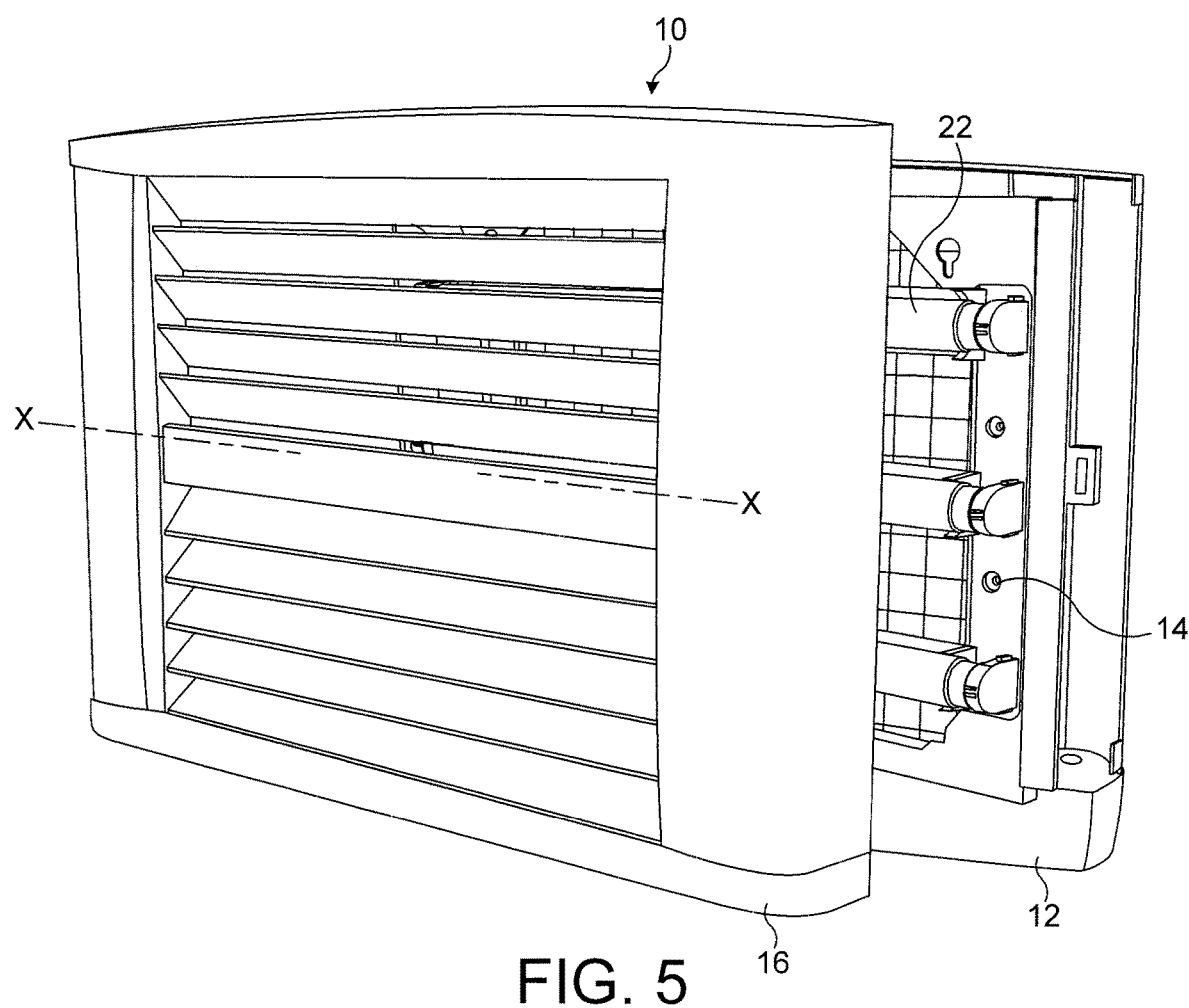
FIG. 5 is an exploded perspective view of the insect trap of FIG. 1 showing the cover being removed and the frame slightly open (without the shields of the second aspect)

Referring to the Figs an insect trap (10) according to a first aspect of the invention comprises three basic components: a back housing (12); a frame (14) and a cover (16). These are clearly illustrated in FIG. 5. The frame (14) is a perimeter frame (FIG. 3), comprising upper (14a) and lower (14b) frame members and two side members (14c; 14d). The perimeter frame (14) is swing, swivel or hinge mounted to the back housing (12) via a swing mechanism (20) which is substantially hidden (FIG. 2).

Figure 3:
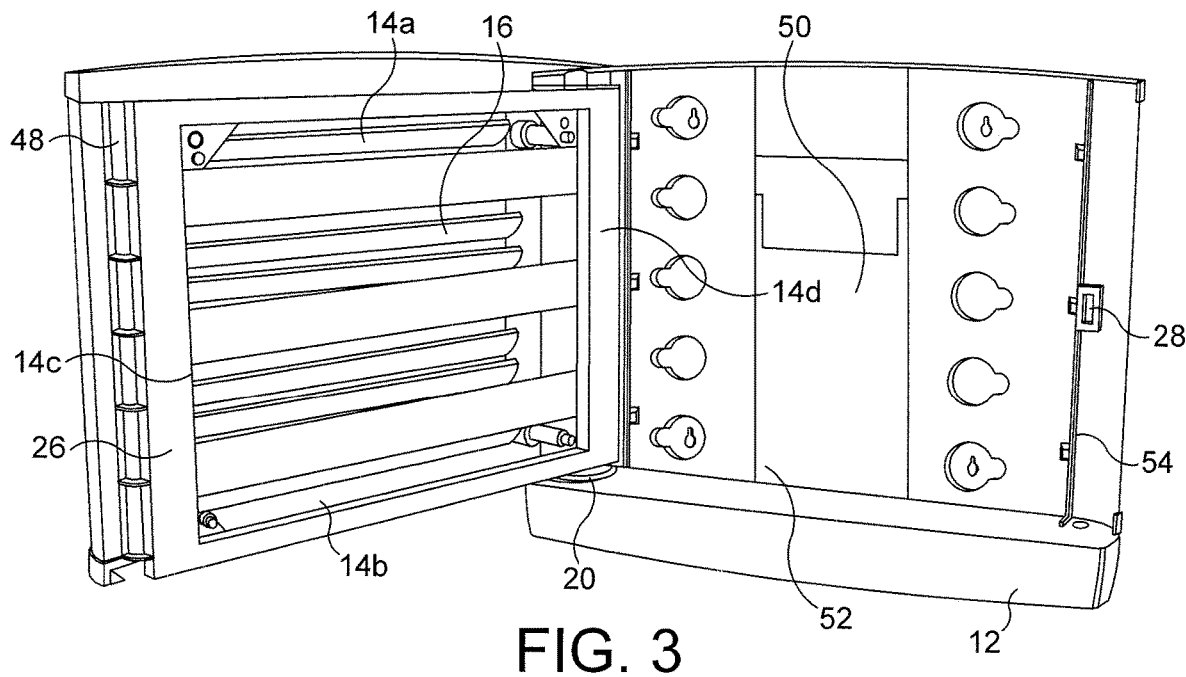
FIG. 3 is perspective view of the insect trap of FIG. 1 with the cover and frame open to a much greater extent and with no glue paper present.
Figure 4:
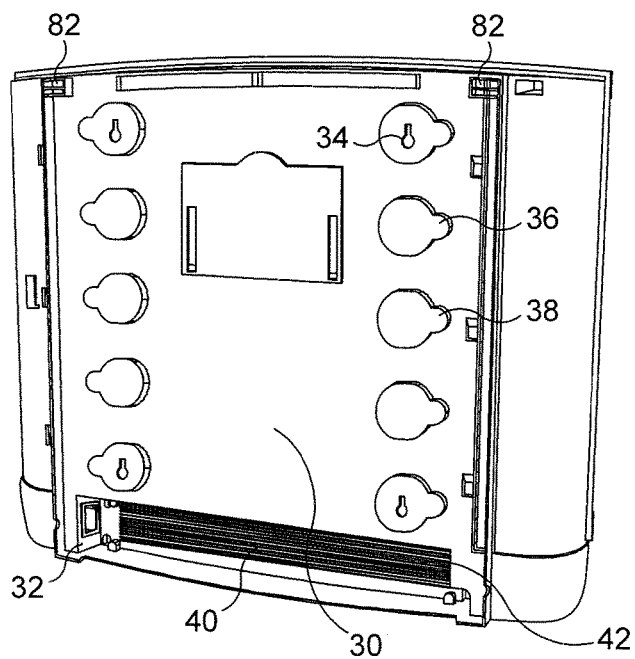
FIG. 4 is rear view of the insect trap of FIG. 1.
Figure 6:
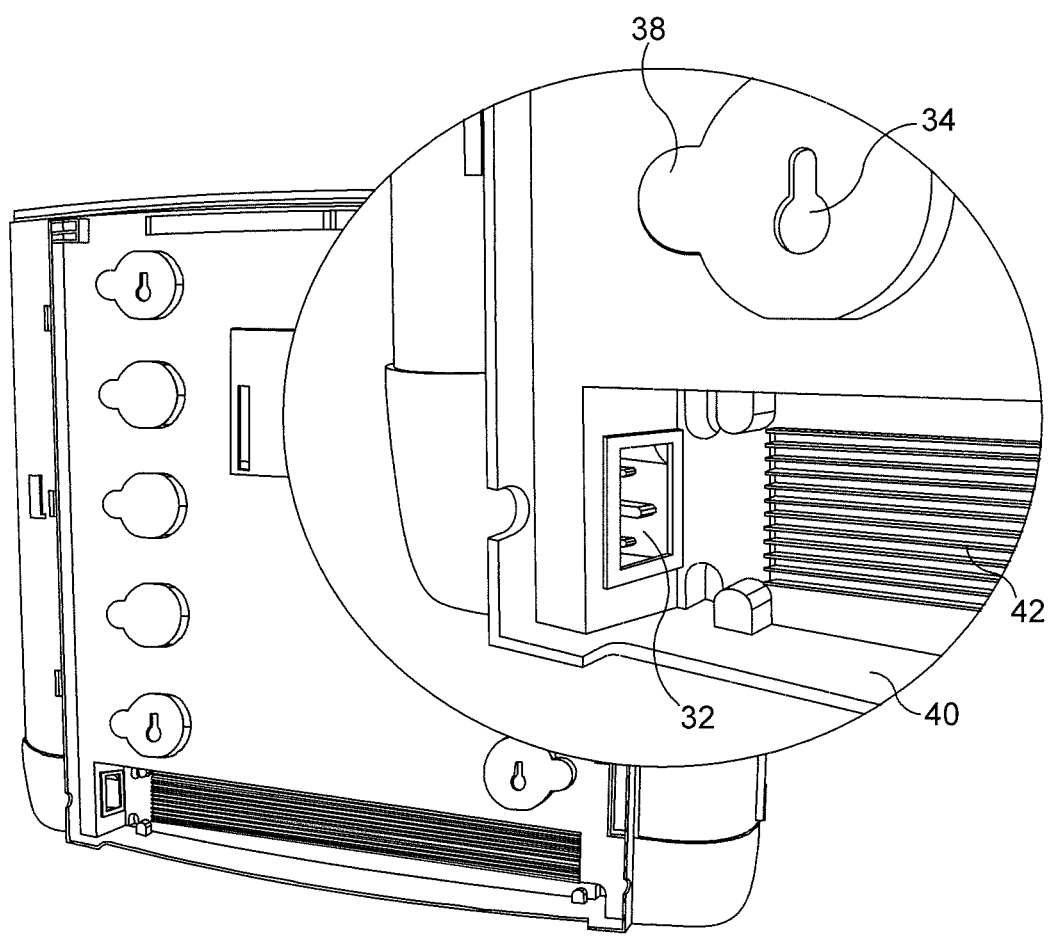
FIG. 6 is view of the rear of the back housing with the lower left side shown enlarged.

A plurality of 15W or 25W UV lights (22), three are illustrated in the example, are connected to paired electrical fittings (24a; 24b) (FIG. 2), and wiring (not shown) runs in channels or conduits (not shown) which are sealed by rubber or silicon gaskets (not shown) and enclosed by fascia plates (26) (FIG. 3) which are preferably metallic such that they provide rigidity to the moulded plastics frame. The metal also allows the frame to be held shut against a magnetic contact (28) provided on the back housing (12). The wiring runs through the swing mechanism (20) (which is hollow) into the back housing (12) where it exits the rear face (30) at an IEC socket (32) (FIGS. 4 and 6). The back housing is additionally provided with one or more key hole apertures (34) to facilitate mounting, ventilation conduits (36) and cable stowage arms (38). It also comprises a space (40) for a heat sink (not shown) and fluorescent high frequency electronic ballast (42).

Figure 1:
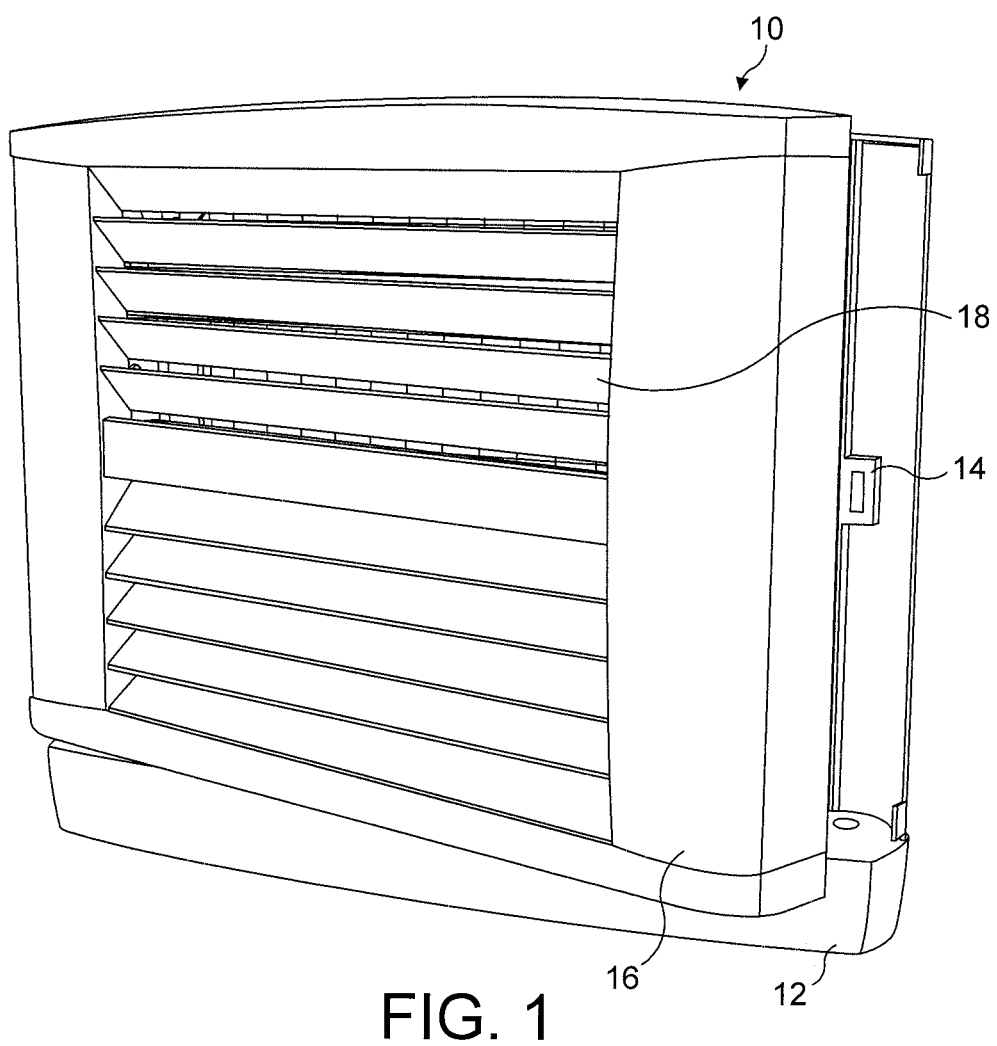
FIG. 1 is perspective view of an insect trap according to the first aspect of the invention with the cover on and frame slightly open.
Figure 2:
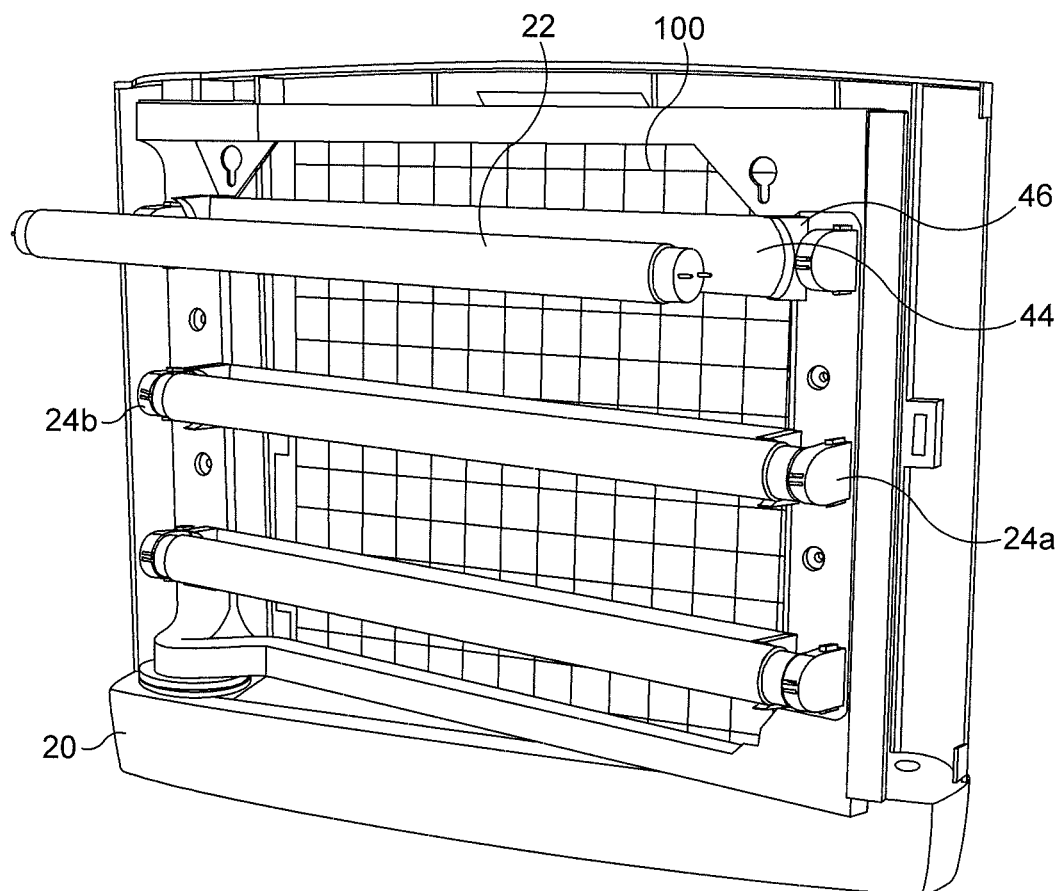
FIG. 2 is perspective view of an insect trap according to the first aspect of the invention with the cover removed.

Behind each light (22) there is provided a reflector (44) which is held in place by stops (46) which enable the reflectors to be sprung mounted thereby facilitating ease of removal for cleaning (FIG. 2). An insect capturing means (100), in the form of e.g. a castellated adhesive paper (FIG. 11) can be easily fitted and/or removed by swinging open the frame (14) and cover (16) of the closed trap (FIG. 1) by placing ones fingers under a flange (48) which extends from the perimeter frame member (14c) opposite the hinged frame member (14a) to an open position as shown in FIG. 3. An adhesive paper (100) can then be fitted to the inner face (50) of the back housing (12) over ridges (52) by pushing it over shaped retaining pegs (54) and moving it in a downwardly direction such that the paper is held in place by the pegs (54). To remove the paper the paper is lifted to align the castellation with the pegs before pulling it over the pegs.

The cover (16) is made of a translucent material and has an innermost surface which is shaped or roughened to maximise the transmission of UV light as set out in EP1457111. The openings (18) which allow insects in are louvered and are angled to prevent the lights (22) being visible when viewed substantially perpendicularly to the normal plane of the back housing (12). The general principle of maintaining a pleasant appearance of trap is set out in EP0947134 but the use of louvers is a further improvement in this regard. In particular, the louver openings (18) are paired about a centre axis (x-x) to provide a downward and upward inflexion respectively of between 30 and 60°.

Figure 7:
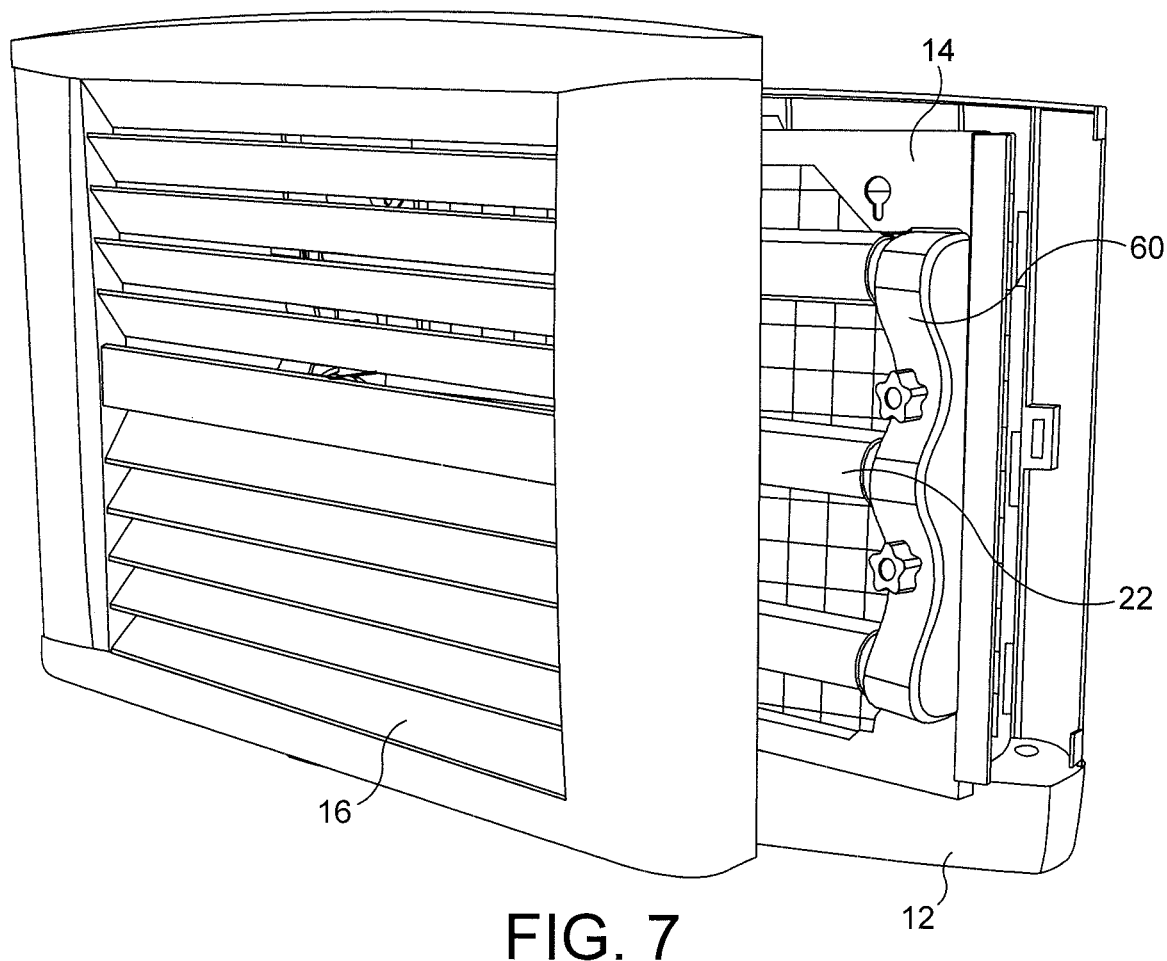
FIG. 7 is an exploded perspective view of the insect trap of FIG. 1 showing the cover being removed and the frame slightly open (with the shields of the second aspect in place)
Figure 8:
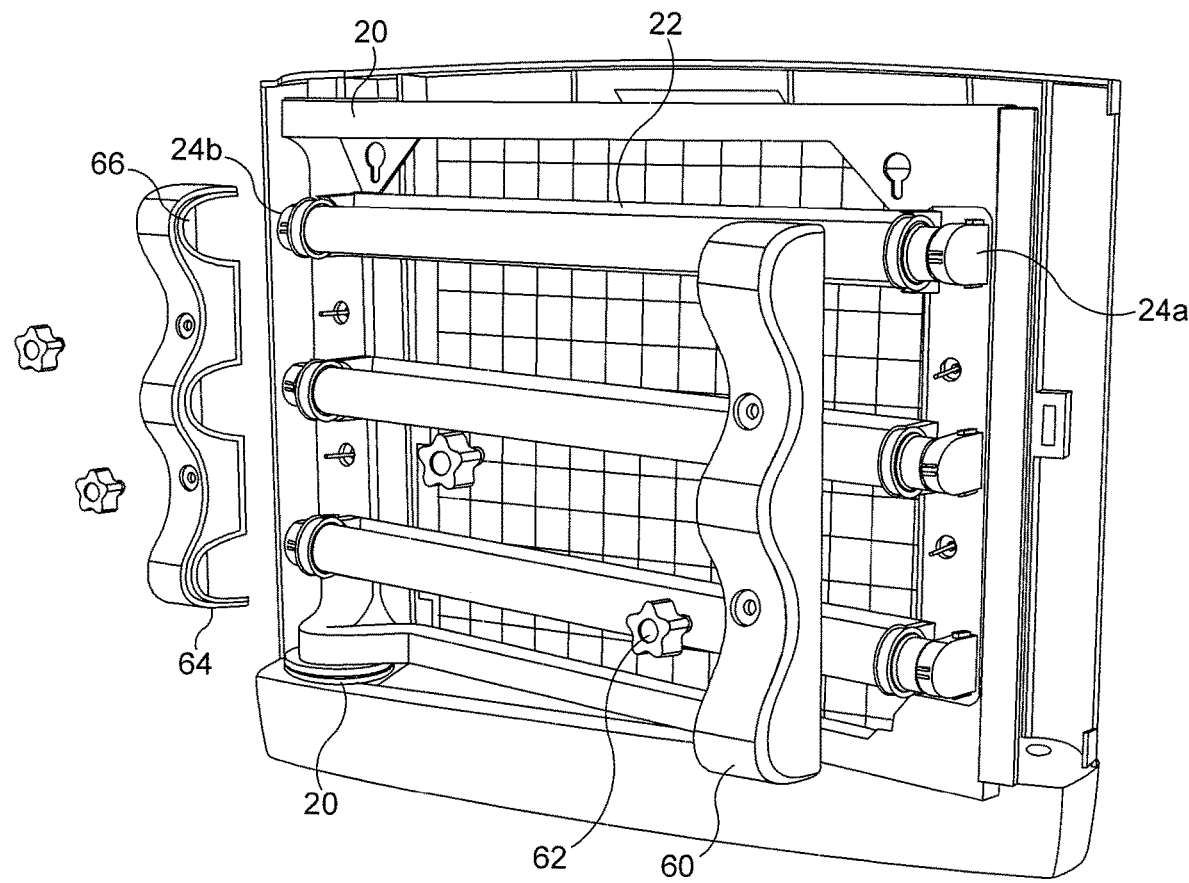
FIG. 8 is an exploded perspective view of the insect trap of FIG. 1 with the cover removed, the frame slightly open and the shield of the second aspect of the invention about to be fitted.
Figure 9:
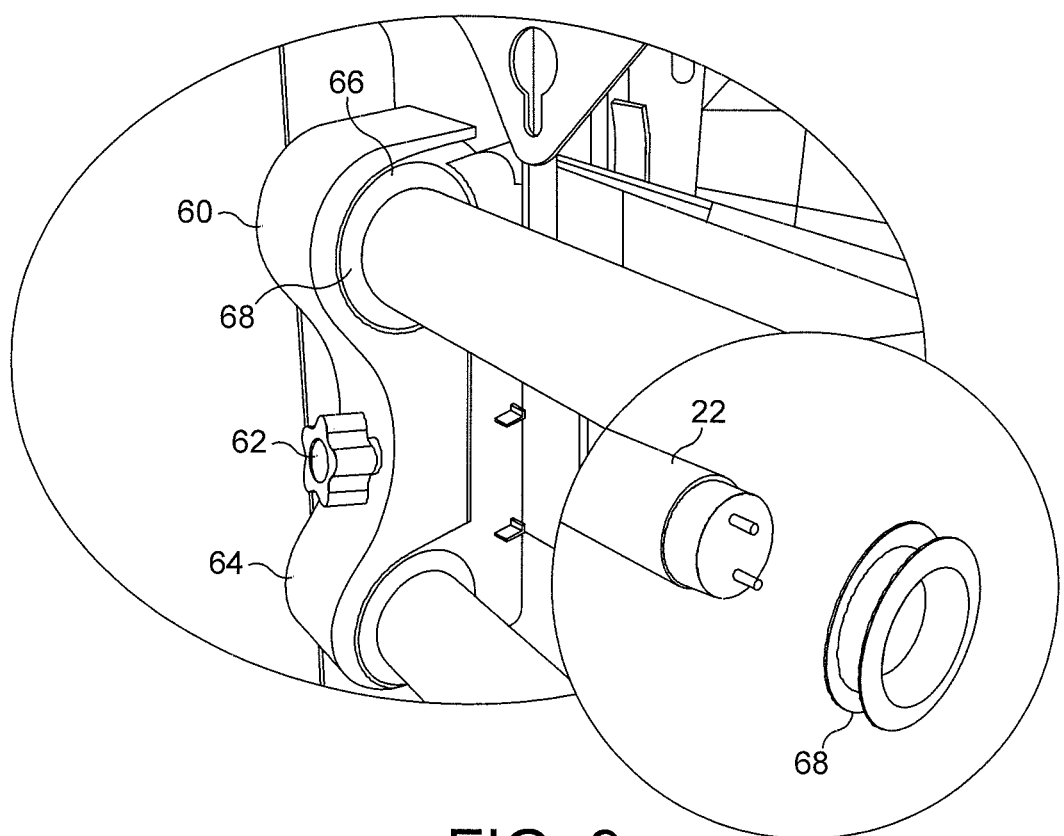
FIG. 9 is a detailed partial view of the shield of the second aspect of the invention in its fitted position.

The second and an independent aspect of the invention illustrated by the insect trap is most clearly illustrated with reference to FIGS. 7-9. It relates to a trap which need not comprise a frame (14) swing mounted to the back housing (12) as per the first aspect of the invention. It addresses the issue of trap serviceability and simplifies the seal mechanism around a trap comprising a plurality of lights (22) and paired electrical fittings (24a; 24b) making the trap well suited to jet washing (to IP65 requirements). Rather than seeking to place a sealed fitting around each contact point, instead shields (60) are fitted around a plurality of lights (22) and a plurality of electrical fittings (24a or 24b) to sealable protect a plurality of contacts simultaneously against water ingress. In this manner two single shields (60) can be removed to access a plurality of lights. In addition to speeding up the process of changing the lights the provision of two manually operable screw fittings (62), which face outwardly and are readily accessible to service personnel, simplifies the change. Thus, each shield (60) comprises a shaped housing (64) comprising a plurality of generally arcuately shaped recesses (66) which are designed to sealingly sit over silicon sealing members or gaskets (68) (FIG. 9) which are fitted about the lights (22) such that when the shields are secured in place over the sealing members (68) the connections are made water tight.

Figure 10:
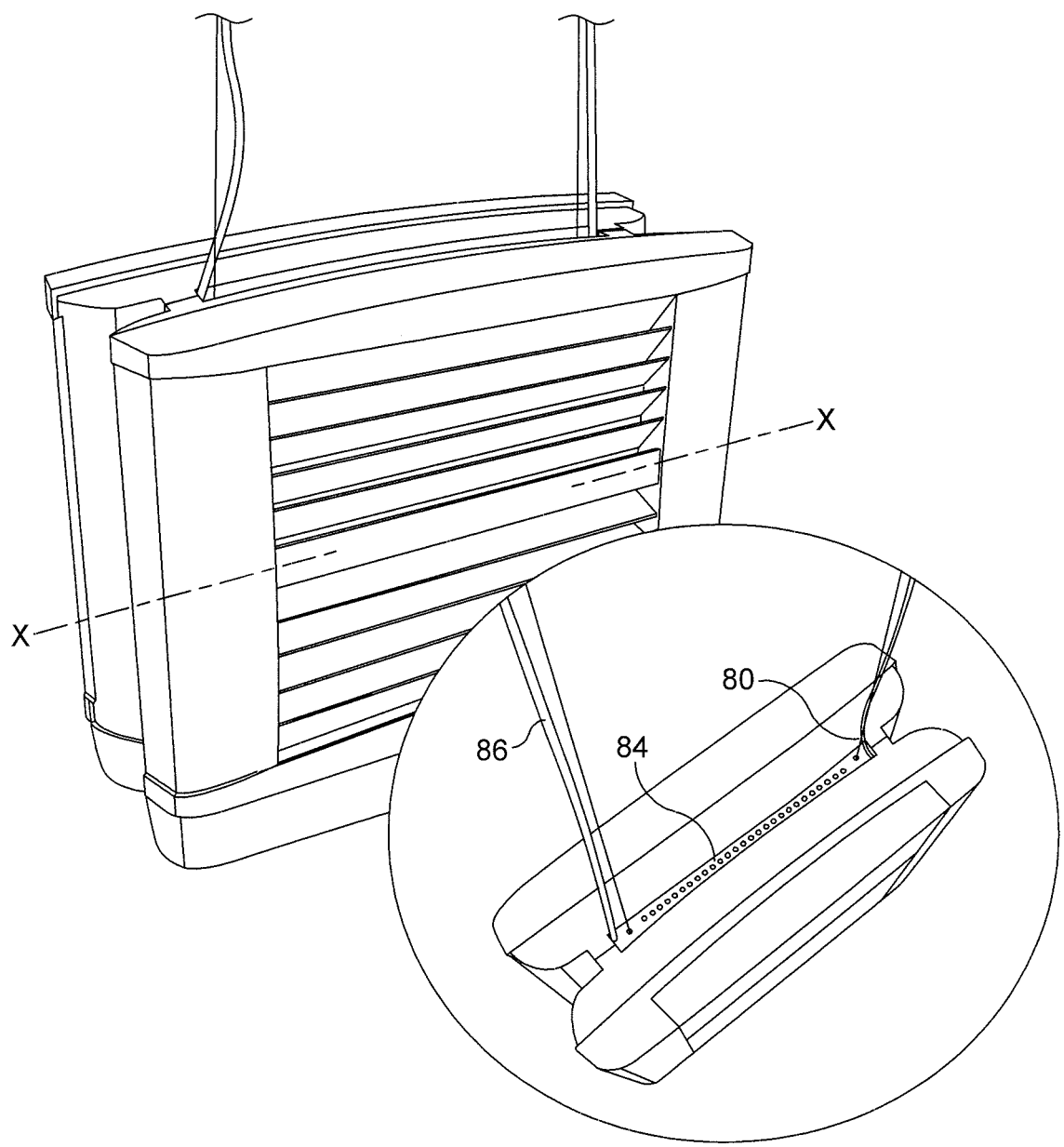
FIG. 10 is a schematic showing two traps linked back to back for suspension mounting.

The traps are designed such that two traps can be connected via a connector (80) (FIG. 10) which slots into apertures (82) in the rear face (30) of the back housing (12). The connector (80) comprises a plurality of apertures (84) running there through allowing cables (86) to be used to suspend the traps.

Figure 11:
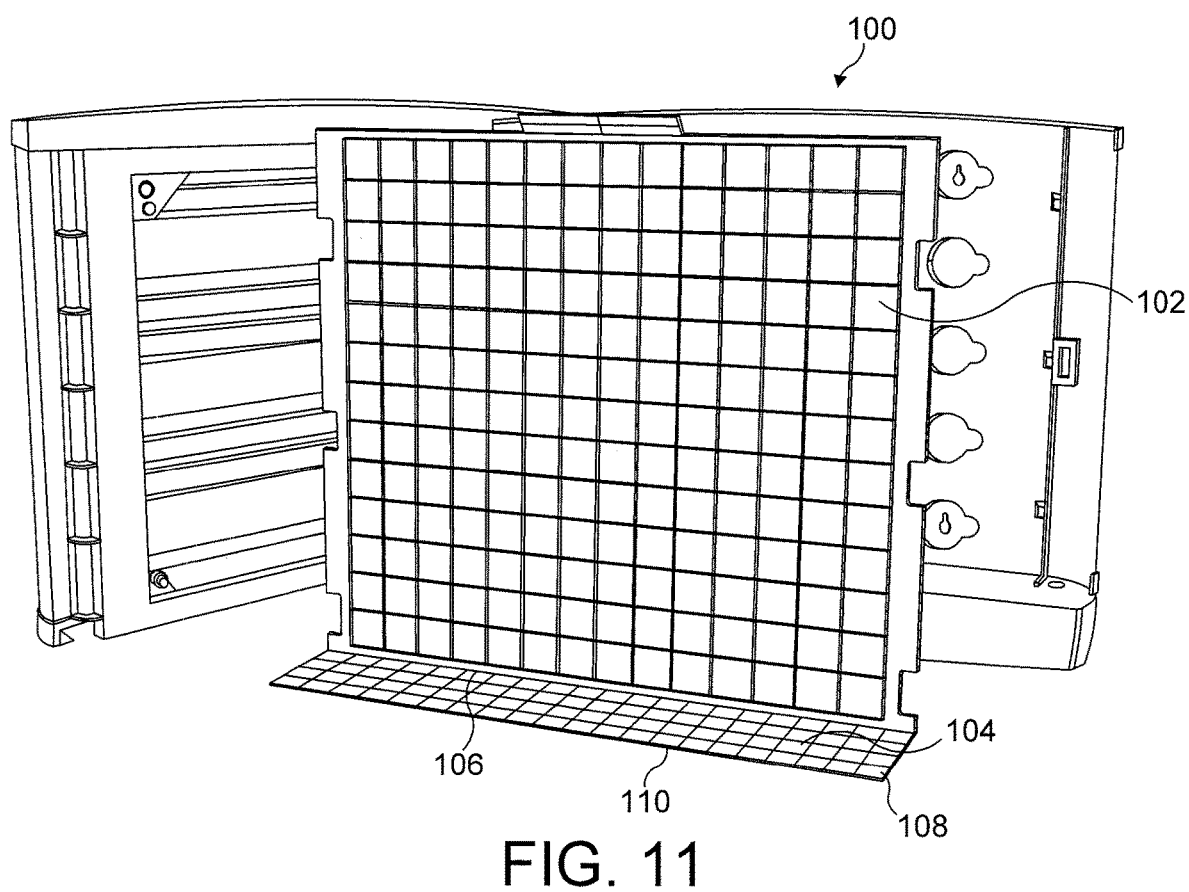
FIG. 11 is perspective view of the insect trap of FIG. 3 with an insect catching means of the third aspect of the invention being fitted.

Referring to FIG. 11, the insect capture means (100), according to the third aspect of the invention, is designed to facilitate identification of and/or counting of captured insects and record keeping. It comprises at least two insect capture surfaces (102; 104), a first surface of which (102) is one colour or shade, preferably black or a dark colour, and a second surface (104) of which is designed to facilitate ease of counting and or identification of captured insects and which is most preferably white or a light shade, as most insects are dark.

Preferably, the second surface (104) is easily detached or otherwise separated from the first surface (102) for record keeping, there being a line of perforations (106) or other means facilitating folding and separation, between the first (102) and second (104) surface.

The second surface includes a non-glued area (108) outside of grid lines (110) for insertion of data, such as date of use information. The grid lines are of a regular size, e.g. 2.5 mm$^2$ to facilitate data capture, such as, number of insects per given area.

The second surface (104) can be at any position but it is preferred to position it within the trap at a position which reflects either average or maximum capture. Maximum capture is likely to occur at the bottom of the trap and accordingly, in the embodiment illustrated, the second surface is the surface which folds to catch falling insects.

The invention claimed is:

1. An insect catching device, comprising:
a capture body having a first portion and a second portion;
at least two insect capture surfaces, a first surface including a first color, and a second surface including a second, lighter color relative to the first color of the first surface, wherein the second color of the second surface highlights the presence of insects captured thereon facilitating at least one of ease of counting and ease of identification of captured insects;
a line of weakening disposed between the first surface and the second surface, wherein the line of weakening includes at least one perforation, the second surface being detachable from the first surface along the line of weakening;
wherein the first color is configured to decrease visibility of captured insects on the first surface observable by a viewer through an insect trap cover;
wherein the first surface is a surface of the first portion of the capture body, and the second surface is a surface of the second portion of the capture body; and
wherein the first portion of the capture body has at least one castellated side including a plurality of notches.

2. The insect catching device according to claim 1, wherein the second surface includes grid lines marked thereon.

3. The insect catching device according to claim 1, wherein the second surface includes a non-capture area, and wherein the non-capture area includes a medium for insect capture data.

4. The insect catching device according to claim 1, wherein at least one of the first surface and the second surface includes surface characteristics defining a plurality of grid lines extending at least one of parallel to each other and crossing each other.

5. The insect catching device according to claim 1, wherein the first surface and the second surface are foldable along the line of weakening such that the first surface and second surface extend transversely to one another.

6. The insect catching device according to claim 1, wherein:
the first surface and second surface respectively include a glued area; and
the second surface further includes a non-glued area defining a medium for recordation of insect capture data.

7. The insect catching device according to claim 1, further comprising a housing in which the at least two insect capture surfaces are removably arranged.

8. The insect catching device according to claim 7, wherein:
the housing includes a bottom on which the second surface is arranged; and
the first surface extends transversely to the second surface and the bottom.

9. The insect catching device according to claim 7, wherein:
the housing includes a bottom and an openable cover extending transversely thereto; and
the housing is configured to retain the at least two insect capture surfaces such that first surface faces toward the cover and the second surface is disposed along the bottom.

10. The insect catching device according to claim 9, wherein the housing includes a plurality of retainers via which the at least two insect capture surfaces are retainable within the housing.

11. The insect catching device according to claim 1, further comprising a housing including a plurality of retainers structured complimentary to the plurality of notches, wherein:
the capture body is arrangeable within and removable from the housing when the plurality of notches and the plurality of retainers are aligned; and
the capture body is retained in the housing via the retainers when the plurality of notches and the plurality of retainers are not aligned.

12. The insect catching device according to claim 1, wherein the capture body is an adhesive sheet.

13. An insect catching device, comprising:
a capture body having a first portion and a second portion;
at least two insect capture surfaces, a first surface including a first color, and a second surface including a second color different from the first color of the first surface, wherein the second color of the second surface is configured to facilitate at least one of ease of counting and ease of identification of captured insects;
a housing in which the at least two insect capture surfaces are removably arranged;
wherein the second surface includes a non-capture area, wherein the non-capture area includes a medium for insect capture data;
wherein the first surface is a surface of the first portion of the capture body, and the second surface is a surface of the second portion of the capture body; and
wherein the first portion of the capture body has at least one castellated side including a plurality of notches.

14. The insect catching device according to claim 13, wherein:
the second surface further includes a grid area on which a plurality of grid lines are disposed; and
the non-capture area is disposed outside of the grid area.

15. The insect catching device according to claim 14, wherein:
the first surface and the second surface are detachably coupled to one another along a line of weakening disposed between the first surface and the second surface; and
the line of weakening includes at least one perforation.

16. The insect catching device according to claim 13, wherein:
the housing includes a plurality of retainers structured and arranged to engage the at least one castellated side of the capture body;
the capture body is arrangeable within and removable from the housing when the plurality of retainers and the plurality of notches are aligned; and
the capture body is retained within the housing when the plurality of retainers and the plurality of notches are not aligned.

17. An insect catching device, comprising:
a capture body having a first portion, a second portion, and at least two insect capture surfaces;
the first portion of the capture body including a first capture surface of the at least two insect capture surfaces;
the second portion of the capture body including a second capture surface of the at least two insect capture surface;
a housing including a bottom and an openable cover extending transversely thereto;
wherein the housing is configured to retain the capture body such that first capture surface of the first portion faces toward the cover and the second portion is disposed along the bottom;
wherein the first capture surface is a first color configured to decrease visibility of captured insects on the first capture surface observable through the cover, and the second capture surface is a second color that highlights the presence of insects captured thereon facilitating at least one of ease of counting and ease of identification of captured insects;
wherein the housing includes at least one retainer structured and arranged to engage an edge of the capture body;
wherein the capture body is arrangeable within and removable from the housing when the at least one retainer and the edge of the capture body are not engaged;
wherein the capture body is retained within the housing when the at least one retainer and the edge of the capture body are engaged;
wherein the edge of the capture body includes a plurality of notches;
wherein the at least one retainer and the edge of the capture body are not engaged when the at least one retainer and one of the plurality of notches are aligned; and
wherein the at least one retainer and the edge of the capture body are engaged when the at least one retainer and the plurality of notches are not aligned.

18. The insect catching device according to claim 17, wherein the second capture surface includes:
a grid area on which a plurality of grid lines are disposed; and
a non-capture area disposed outside of the grid area, the non-capture area including a medium for insect capture data.

19. The insect catching device according to claim 17, wherein:
the first portion and the second portion of the capture body are detachably coupled to one another along a line of weakening disposed between the first portion and the second portion; and
the line of weakening includes at least one perforation.

20. The insect catching device according to claim 19, wherein the first portion and the second portion of the capture body are foldable along the line of weakening such that the first portion and the second portion of the capture body extend transversely to one another.

* * * * *